United States Patent
Janssen

(10) Patent No.: US 10,723,043 B2
(45) Date of Patent: Jul. 28, 2020

(54) METHOD AND DEVICE FOR RECYCLING THERMOPLASTIC FIBRE-REINFORCED COMPOSITE MATERIAL

(71) Applicant: Fraunhofer-Gesellschaft zur Förderung der angewandten Forschung e.V., Munich (DE)

(72) Inventor: Henning Janssen, Aachen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/334,219

(22) PCT Filed: Sep. 19, 2017

(86) PCT No.: PCT/EP2017/073670
§ 371 (c)(1),
(2) Date: Mar. 18, 2019

(87) PCT Pub. No.: WO2018/050926
PCT Pub. Date: Mar. 22, 2018

(65) Prior Publication Data
US 2019/0240871 A1 Aug. 8, 2019

(30) Foreign Application Priority Data
Sep. 19, 2016 (DE) .................. 10 2016 117 559

(51) Int. Cl.
*B32B 43/00* (2006.01)
*B29B 17/02* (2006.01)
(Continued)

(52) U.S. Cl.
CPC ........ *B29B 17/02* (2013.01); *B29B 2017/022* (2013.01); *B29B 2017/0217* (2013.01);
(Continued)

(58) Field of Classification Search
CPC ......... Y10T 156/1184; Y10T 156/1967; B29C 2073/264; B29C 69/005; B32B 43/006
See application file for complete search history.

(56) References Cited

U.S. PATENT DOCUMENTS 5,830,306 A * 11/1998 Hinson, II ........... G02B 6/4403
156/248
6,823,761 B2 * 11/2004 Chiang .................. G02B 6/245
81/9.41

FOREIGN PATENT DOCUMENTS

DE 29604937 8/1996
DE 19943751 3/2001
(Continued)

OTHER PUBLICATIONS

German Patent Office, Office Action in German Patent Application No. 10 2016 117 559, dated Apr. 12, 2017.
(Continued)

*Primary Examiner* — Mark A Osele
(74) *Attorney, Agent, or Firm* — Williams Mullen; Thomas F. Bergert

(57) ABSTRACT

In a method and a device for recycling a thermoplastic fibre-reinforced composite material, which is in at least one deposition layer in a component (1), it is suggested that said fibre-reinforced composite material should be pulled off from the remaining component (1), in the direction of a main fibre direction, in at least one pull-off layer (10) comprising fibres and matrix material.

16 Claims, 1 Drawing Sheet

Figure 1:
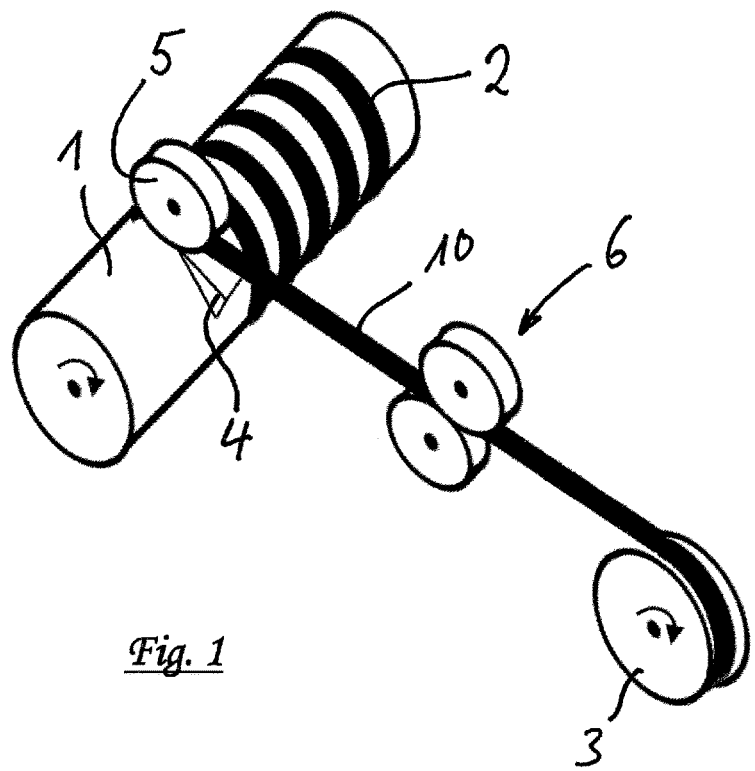

(51) Int. Cl.
    *B29K 105/06*     (2006.01)
    *B29K 101/12*     (2006.01)
    *B29C 73/26*     (2006.01)
    *B29K 307/04*     (2006.01)

(52) U.S. Cl.
    CPC . *B29B 2017/0255* (2013.01); *B29C 2073/264* (2013.01); *B29K 2101/12* (2013.01); *B29K 2105/06* (2013.01); *B29K 2307/04* (2013.01); *Y02W 30/622* (2015.05); *Y10T 156/1184* (2015.01); *Y10T 156/1967* (2015.01)

(56) References Cited

FOREIGN PATENT DOCUMENTS

| | | |
|---|---|---|
| DE | 102010031602 | 1/2012 |
| DE | 102011115966 | 4/2013 |
| DE | 102014214570 | 1/2016 |
| EP | 1160068 | 12/2001 |
| EP | 1892072 | 2/2008 |
| EP | 2282879 | 2/2011 |
| EP | 2977190 | 1/2016 |
| JP | 2009132028 | 6/2009 |
| KR | 100736449 | 7/2007 |
| WO | 2010075952 | 7/2010 |
| WO | 2012085000 | 6/2012 |

OTHER PUBLICATIONS

European Patent Office, International Search Report and Written Opinion, PCT/EP2017/073670, dated Nov. 9, 2017.

\* cited by examiner

METHOD AND DEVICE FOR RECYCLING THERMOPLASTIC FIBRE-REINFORCED COMPOSITE MATERIAL

CROSS-REFERENCE TO RELATED APPLICATIONS

This application is the U.S. National Stage of International Application PCT/EP2017/073670, filed on Sep. 19, 2017, which claims the benefit of German Patent Application 10 2016 117 559.5 filed on Sep. 19, 2016; all of which are hereby incorporated herein in their entirety by reference.

The invention relates to a method and a device for recycling thermoplastic fiber composite material which is arranged in at least one deposition layer in a component.

Components made of or comprising thermoplastic fiber composite material can be used in many ways, in particular as high-strength components, such as, for example, pipes for pipelines or pressure tanks. Often, the fiber composite material has endless, i.e. interruption-free, fiber material. The fiber material can be present, for example, as a semifinished product pre-impregnated with plastic matrix. These can be, for example, single-layer fiber semifinished products, what are known as tape semifinished products, in which the fibers are present either unidirectionally or multidirectionally. Such semifinished products can be processed in various methods, amongst others a tape deposition or winding method, to form components and in particular also applied in multiple layers.

Recycling of carbon fiber-reinforced plastics has already been discussed (Carbon Fiber-reinforced Plastics in Vehicle Construction—Resource Efficiency and Technologies; VDI ZRE Publications: Brief analysis No. 3, VDI Center for Resource Efficiency, 2013, revised edition March 2014). Accordingly, it is known to cut up the material to be supplied to reuse, which is associated with a corresponding shortening of the carbon fibers. Therefore, what is known as downcycling occurs, i.e. the recovered material is of lower quality and can be used only in a corresponding restricted way. In addition, it is taught that efficient separation of fibers and matrix material is crucial.

EP 1892072 A1 discloses a method for recycling thermoplastic carbon fiber-reinforced materials in which the composite material is first shredded and then supplied to an injection molding process. Material obtained by the recycling is also present only with short carbon fibers here.

DE 102011115966 B4 discloses a method for producing a carbon fiber recyclate for CFP components, in which a CFP material which has carbon fiber bundles in a matrix material is comminuted. The aim is to obtain a recyclate raw material in which there are carbon fiber bundle sections surrounded by matrix material. The recyclate raw material is subjected to a decomposition treatment in the form of pyrolysis or carbonization of the matrix material. Here, too, the carbon fibers cannot keep their original length.

From EP 1160068 B1 it is known to subject composite material to microwave radiation in such a way that the matrix material is decomposed to such an extent that the carbon fibers contained therein can be separated out largely without damage. The use of a solvent for the matrix material can also be provided, so that the fibers then float in the solvent. However, for the microwave treatment it is necessary to prepare suitable pieces of the composite material, for which reason, here too, the fibers are usually comminuted as compared with the state in the original component.

From EP 22822879 B1 it is known to separate the carbon fibers, for example by means of a pyrolysis process, from the matrix material for recycling. The free fibers obtained are provided with a binder. Using the binder, packets of fibers are produced which, in their structure, correspond to the arrangement in the original material. The formation of fiber loops is avoided, and the packets can be used for making a new semifinished product. Even this procedure requires fragmentation of the original composite material with large components in any case.

WO 2010075952 A1 discloses a method and a device for recovering carbon fibers from carbon fiber reinforced plastic objects, in which there is provided a process chamber which has at least one microwave radiation source and/or at least one hot gas inlet and/or at least one electric resistance heater. Once more, separation of the matrix material from the fibers is the aim. The composite material to be reused is guided piece by piece over an endless conveyor belt through the respective treatment stages, so that endless carbon fibers cannot be obtained as recycling product.

DE 102010031602 A1 discloses a method in which, for a recycling process, a pyrolysis process is likewise provided in order to separate out the matrix. The raw material is fragmented if necessary. The pyrolysis gases can be used to obtain energy.

The invention is based on the technical problem of providing a method and a device of the type mentioned at the beginning which represent an alternative to the prior art and can offer an improved recycling result, in particular whilst obtaining greater lengths of the fiber material.

The technical problem is achieved in a method having the features of claim 1 and in a device having the features of claim 15.

Preferred exemplary embodiments of the method according to the invention and of the device according to the invention are illustrated in the dependent claims.

Accordingly, the fiber composite material which is to be supplied to recycling is pulled off in layers in the composite of fibers and matrix material from the remaining component. Here, use is made of the reversible melting properties of the thermoplastic matrix. The method is generally suitable for reinforcing fibers of all types, in particular for carbon fibers but also, for example, glass fibers or basalt fibers.

Since the fiber composite material is usually present in multiple layers in the component, the pull-off layer is pulled off a further layer of the same fiber composite material lying underneath. However, the pull-off layer can also be detached from a base material, e.g. another fiber composite material, or from a base material of the component on which the original undermost layer or a single layer of the fiber composite material was applied. A pull-off layer is preferably a complete laminate layer, as was previously present in the component.

By using the method according to the invention, it is possible to dispense with separation of the matrix material from the fibers and with cutting that shortens the fiber length. If matrix material and fibers remain in the composite of the recyclate, it is possible to save a considerable expenditure of energy for the production of a new material capable of use, in particular the expenditure of energy for the fiber production and/or the impregnation. The recycle process described can be viewed for many production processes of components with fiber composite material as a reversal of a production step, namely the layered application of the fiber composite material and the joining of the layers. The fiber composite material can be pulled off such that a single coherent recyclate piece is produced. In one and the same component, however, the pulling-off of a pull-off layer can also be started many times, so that a multiplicity of recyclate pieces can be produced from one component. A recyclate piece can have a length of several centimeters up to several kilometers, e.g. 10 km.

For pulling off the pull-off layer, provision can be made to heat the fiber composite material. The whole of the fiber composite material can be heated globally or, in a locally restricted manner, the fiber composite material in the detachment area. The heating facilitates the pulling-off process and can prevent damage of the pull-off layer. Possible heat sources are, for example, infrared radiators, lasers, electric resistance, hot air or hot gas, microwave, ultrasound or an oven, for example a circulating air oven. The process temperature can lie both below and above the melting temperature of the matrix material of the fiber composite material.

The method according to the invention can also be carried out such that the fiber composite material is pulled off in tape form. A tape-like pull-off layer has the advantage that the detached fiber composite material can easily be collected on a storage element, in particular on a storage roll. If the original fiber composite material was already supplied in tape form and was applied for the production of the component, it is possible for the material pulled off to correspond at least largely to the original tape material. Ideally, the collected tape-like material can be used right away for the production of a new component.

In general, the pull-off layer can correspond largely in shape to the originally applied material. If the original material was produced, for example, in a tape deposition process or a winding process in multiple layers, the pull-off layer can correspond to the original tape. The method according to the invention can also be carried out in raw material which has been produced in another way than by a tape laying process or winding process, for example without the use of a laser, e.g. by means of heating in another way and subsequent pressing. The pull-off layer can also be shaped rotationally symmetrically, in a plate-like manner or in another way.

The method according to the invention can also be carried out such that a separating tool is used to separate the pull-off layer from the component. Such a separating tool can be, for example, a shearing knife or a wedge-shaped separating element, which is used in the pocket area, i.e. at the contact point between the pull-off layer and the material still remaining in the component.

The separating tool can be heated, e.g. by thermal conduction, electric resistance, irradiation or other measures. Provision can be made for the pull-off layer to be guided by means of a guide roller arranged opposite the separating tool. In this way, kinking of the pull-off layer and therefore the fibers present therein can be prevented. The guide roller can also be heated.

The method according to the invention can also advantageously be carried out such that, during the production of the component, component data, in particular relating to the fiber layer and/or laying direction, is stored and used to assist the recycling method, in particular for determining a pull-off direction and/or a starting point for the pull-off process.

The pull-off layer is ideally detached in the fiber direction, in order as far as possible to prevent destruction of the fibers or part of the fibers. If the laying direction used during the production of the component is known, the pull-off layer can be detached in the opposite direction, so that detachment is carried out in the direction of the fiber course. Ideally, the fiber structure can be maintained over the entire length of the fiber material to be pulled off. Moreover, it is possible that, in addition to the fibers, the matrix material also remains largely undamaged, so that, in the ideal case, the pull-off layer can be used again without further processing of the same.

The component data can be stored in readable form in or on the component, for example by means of RFID (radio frequency identification) or QR code or bar code. The data can, of course, also be present in a separate data carrier separated from the component.

The component can also have markings which permit automatic detection of the geometric orientation of the component in space, by which means automatic processing of the component for recycling can be assisted.

The method according to the invention can also be carried out such that, by means of at least one non-destructive material testing method, the fiber composite material is examined before, during and/or after the detachment from the remaining component, and the result of the examination is used to control or regulate the pull-off process.

It is also possible to change the shape of the pull-off layer, in particular by pressing, for example by means of at least one calender, and/or by material application, for example by extrusion. With the material application, degraded or lost matrix material can be replaced. In addition, shaping by a pultrusion tool is conceivable.

It is also conceivable to separate off parts of the pull-off layer following the detachment from the component, for example by a cutting process. This may be necessary in order to remove highly damaged material or to reduce the dimensions of the pull-off layer to a specific needed dimension.

Furthermore, the method according to the invention can also provide separation of fibers and matrix material in the pull-off layer, for example by means of separating methods known from the prior art, such as, for example, by means of microwave or pyrolysis. The fiber material can be used for the production of a new fiber composite material.

A device according to the invention can simultaneously be set up for the production of new components from the recycled fiber composite material. Thus, a combination device is, which can produce both a recyclate and also a new component from the recyclate obtained. Such a combination device can be implemented, for example, by installing a recycling module in an existing new component production system, for example a winding system.

Exemplary embodiments of the method according to the invention and of the device according to the invention are illustrated below by using two figures.

In the figures, schematically

Figure 2:
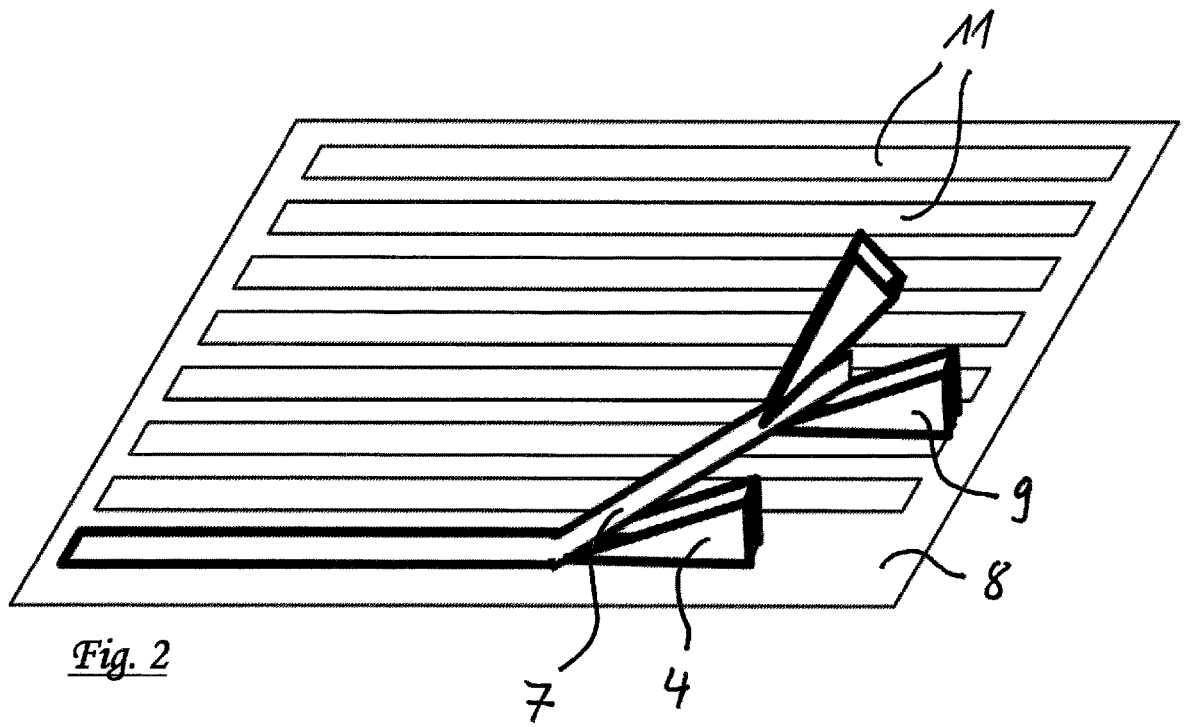

FIG. 1: shows the recycling of fiber composite material from a component with a round surface, and FIG. 2: shows the recycling of fiber composite material from a plate-like component.

FIG. 1 shows a component 1 in cylindrical form, the surface of which is produced from a tape 2 of a fiber composite material. Usually, multiple layers of the tape 2 are deposited on such a component 1, wherein—not illustrated here—the tape 2 can have different orientations in the different layers. Here, merely for simpler illustration and recognizability, the tape 2 is illustrated in a single layer and with a distance between the turns.

For the detachment of the fiber composite material, by using a gripper, not illustrated here, a pull-off layer 10 is lifted off the component 1 and supplied to a storage roll 3. The shape of the pull-off layer 10 corresponds to the tape 2 found on the component 1 or, in the ideal case, is identical thereto. In order to facilitate the detachment of the pull-off layer 10, a wedge-shaped separating tool 4 is provided, which acts between the already detached part of the pull-off layer 10 and the component 1. The pull-off layer 10 is guided by means of a guide roller 5, which prevents possible kinking of the pull-off layer 10 and of the fibers, not illustrated separately here, contained in the pull-off layer 10. Before being wound onto the storage roll 3, the pull-off layer 10 also passes through a roller pair 6, which, for example, can be used for shaping as a calender for the pull-off layer 10 and/or for stabilizing the orientation of the pull-of layer 10 in space. In the way illustrated, the complete tape 2 located on the component 1 can be wound onto the storage roll 3 as a pull-off layer 10 and then supplied to a recovery process. The pull-off layer 10 can contain unspoiled endless fibers.

FIG. 2 shows the detachment of a further pull-off layer 7 of a fiber composite material but here in strip form, which is located on a plate-like component 8, the extent of which in its plane restricts the length of strips 11 of the fiber composite material. By using a tongs-like gripping unit 9, of which only two tongs elements can be seen schematically in FIG. 2, the pull-off layer 7 has been gripped and lifted off the component 8. A wedge-shaped separating tool 4 is used to assist the detachment process. Thus, over its entire length, the pull-off layer 10 can be lifted off the component 1 without destroying the fibers contained therein. The strip-like pull-off layers 7, which, in the ideal case, correspond to the strips 11 originally located on the component, can be collected and supplied to recycling.

LIST OF DESIGNATIONS

1 Component
2 Tape
3 Storage roll
4 Separating tool
5 Guide roller
6 Roller pair
7 Strip
8 Component
9 Gripping unit
10 Pull-off layer
11 Strip

The invention claimed is:

1. A method for recycling thermoplastic fiber composite material which is arranged in at least one deposition layer in a component, in which, in the direction of a main fiber direction, fiber composite material is pulled off the remaining component in at least one pull-off layer comprising fibers and matrix material, wherein during the production of the component, component data relating to the fiber layer and/or laying direction, is stored and is used to assist the recycling method for determining a pull-off direction and/or a starting point for the pull-off process.

2. The method as claimed in claim 1, wherein the at least one pull-off layer is pulled off a further layer of the fiber composite material or off a base element of another material.

3. The method as claimed in claim 1, wherein the fiber composite material is heated, at least in a detachment area.

4. The method as claimed in claim 1, wherein the fiber composite material is pulled off in tape form.

5. The method as claimed in claim 1, wherein the detached fiber composite material is collected on a storage element.

6. The method as claimed in claim 4, wherein the detached fiber composite material is collected on a storage element.

7. The method as claimed in claim 1, wherein a separating tool is used to separate the at least one pull-off layer from the component.

8. The method as claimed in claim 7, wherein the separating tool is heated.

9. The method as claimed in claim 7, wherein the at least one pull-off layer is guided by means of a guide roller arranged opposite the separating tool.

10. The method as claimed in claim 1, wherein the component data is stored in readable form in or on the component.

11. The method as claimed in claim 1, wherein, by means of at least one non-destructive material testing method, the fiber composite material is examined before, during and/or after the detachment from the rest of the component, and the result of the examination is used to control or regulate the pull-off process or stored for documentation purposes.

12. The method as claimed in claim 1, wherein markers for position determination are applied to the component.

13. The method as claimed in claim 1, wherein the shape of the pull-off layer is changed by pressing, by at least one calender, or by at least one pultrusion tool and/or by material application.

14. The method as claimed in claim 1, wherein fibers and matrix material are separated from each other after being pulled off the component.

15. A method for recycling thermoplastic fiber composite material which is arranged in at least one deposition layer in a component, in which, in the direction of a main fiber direction, fiber composite material is pulled off the remaining component in at least one pull-off layer comprising fibers and matrix material, wherein the shape of the pull-off layer is changed by pressing, by at least one calender, or by at least one pultrusion tool and/or by material application.

16. A device for recycling thermoplastic fiber composite material which is arranged in at least one deposition layer in a component, comprising:
    means for pulling off at least one pull-off layer comprising fibers and matrix material of the fiber composite material from the remaining component in the direction of a main fiber direction, and
    means for changing the shape of the pull-off layer by pressing by at least one calender, at least one pultrusion tool and/or by material application.

* * * * *